May 14, 1929.  J. H. CLARK  1,713,114
SUPPORT FOR TRACTOR BODIES
Filed Oct. 1, 1923  2 Sheets-Sheet 1
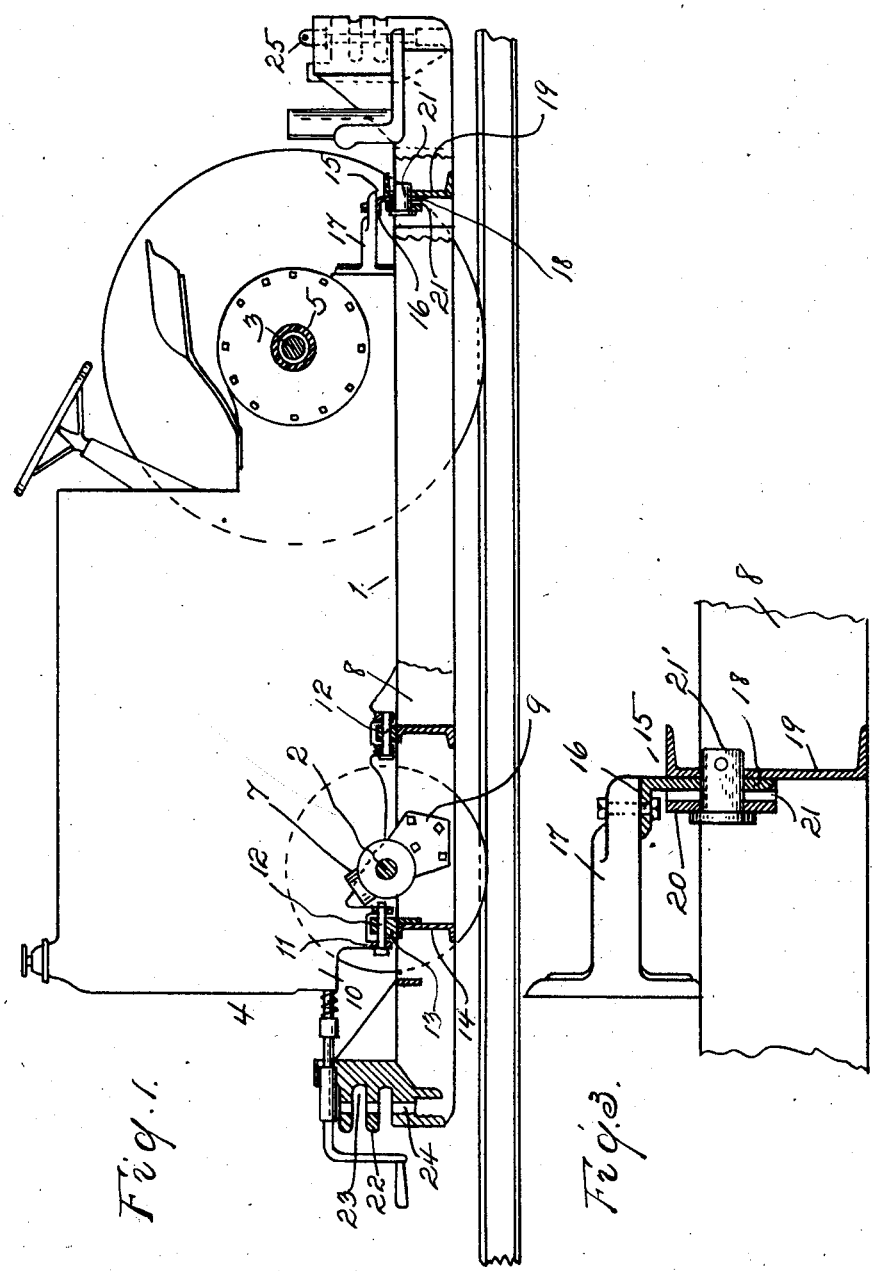
Inventor
James H. Clark
By Whittemore Hulbert Whittemore
 Belknap
  Attorneys

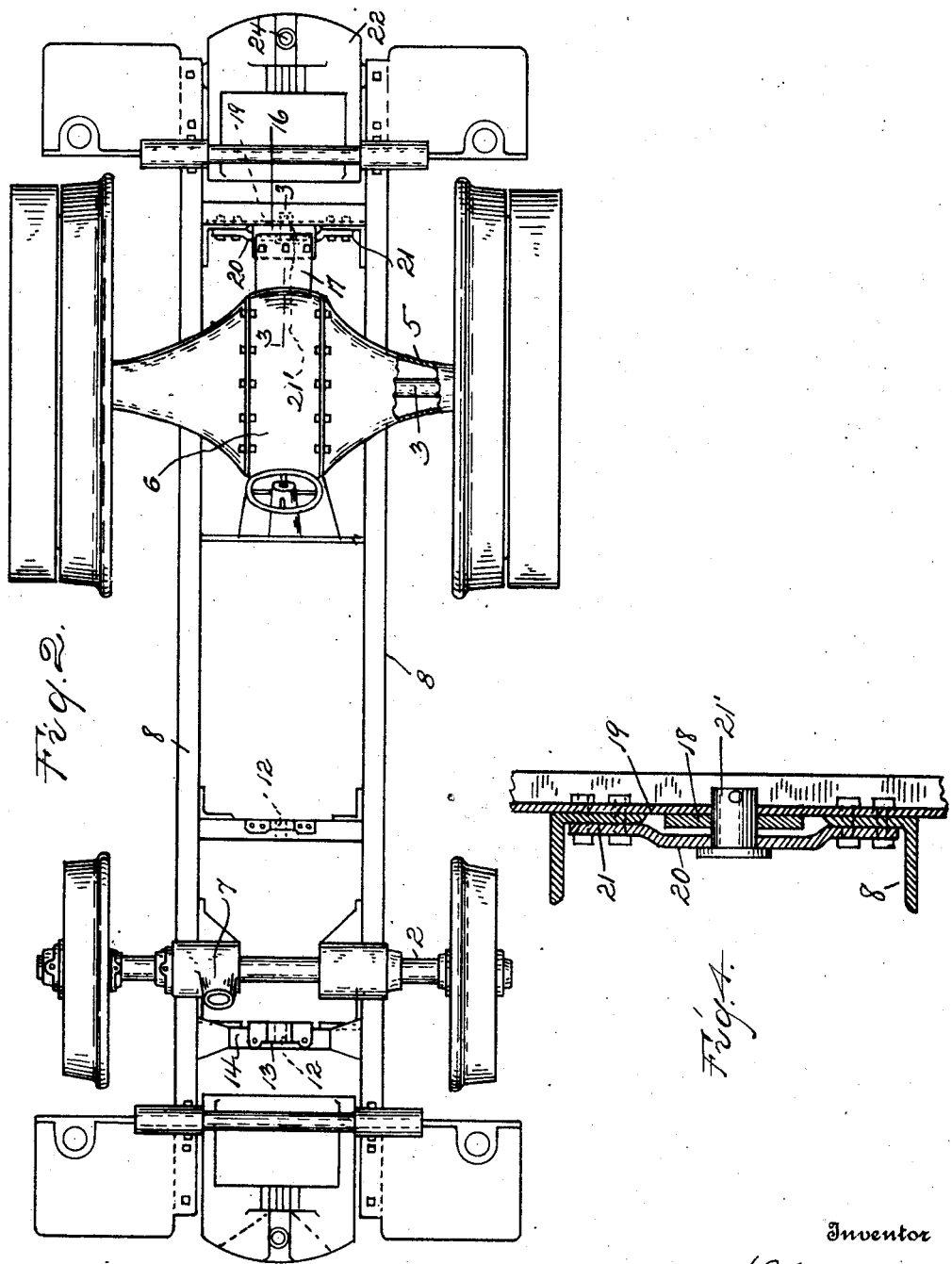

Patented May 14, 1929.

1,713,114

UNITED STATES PATENT OFFICE.

JAMES H. CLARK, OF RIVER ROUGE, MICHIGAN.

SUPPORT FOR TRACTOR BODIES.

Application filed October 1, 1923. Serial No. 666,034.

This invention relates to vehicles and refers more particularly to supports for tractor bodies.

An object of the invention is to provide the vehicle body with a simple and effective support which will permit one axle of the vehicle to assume an inclined position while the other axle remains in a normal horizontal position.

Another object is to provide one of the axles with interchangeable bearings that are secured to the support.

Another object is to provide a support which preferably has strong and durable means for coupling either end of the tractor to a second vehicle.

Another object is to provide a strong and durable support which can be manufactured at a comparatively low cost.

With the above and other objects in view, the invention consists of certain novel features of construction, combination and arrangement of parts as will be more fully described and particularly pointed out in the appended claims.

In the accompanying drawings:

Figure 1 is a side elevation of a tractor embodying my invention and showing parts in section;

Figure 2 is a top plan view thereof and showing parts in section;

Figure 3 is a sectional view taken on line 3—3 of Figure 2;

Figure 4 is a detail view of one of the bearings.

Referring now to the drawings in which like characters of reference designate corresponding parts throughout the several views, the numeral 1 designates an elongated horizontal frame preferably located beneath the front and rear axles 2 and 3 respectively of a tractor body 4. The rear axle 3 is journaled in the usual housing sections 5 projecting outwardly from the opposite sides of the transmission housing 6 of the body while the front axle 2 is preferably journaled in upwardly inclined bearings 7 that are rigidly secured to the side bars 8 of the frame. These bearings are preferably interchangeable and are therefore preferably provided with oppositely inclined portions 9 for alternate engagement with the side bars of the frame.

The frame is preferably pivotally connected to the tractor body at spaced points and, for this purpose the engine housing 10 is preferably provided with the usual aligned spaced yokes 11 which are pivotally connected by means of headed pins 12 to brackets 13 that are rigidly secured to channel-shaped cross-bars 14 of the frame. Located at the rear end of the tractor body is an angle member 15 that has a horizontal portion 16 preferably bolted to the usual drawbar cap 17 of the tractor, and a vertical portion 18 that projects downwardly from the horizontal portion 16 and that extends between a channel-shaped cross-bar 19 of the frame and the forwardly arched portion 20 of a transversely extending plate 21 which is secured to the cross-bar 19. The vertical depending portion 18 of the angle member is pivotally connected to the plate 20 and cross-bar 19 by means of a suitable headed pin 21' which is preferably in alignment with the pins 12.

Thus should one of the rear wheels of the vehicle encounter irregular surfaces, the frame 1 will be permitted to remain in a horizontal position, while the rear axle 3 and body 4 are inclined to one side or the other; likewise, should the irregular surfaces be encountered by one of the front wheels of the vehicle, the body 4 and rear axle 3 will be permitted to remain in normal horizontal position, while the front axle 2 and frame 1 will assume an inclined position.

In order that the tractor may be coupled to another vehicle, I preferably provide a pair of blocks 22 which are rigidly secured to the side bars 8 of the frame at the opposite ends thereof. Each block is preferably provided with a series of horizontal recesses 23 which are adapted to receive an eye of a drawbar (not shown) and which intersect at spaced points a vertical recess 24 in the block that is adapted to receive a suitable pin 25 for securing the eye of the drawbar.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:—

1. The combination with a vehicle body and an axle journaled in the body, of a frame pivotally secured at one end to said body, a cross-bar carried by said frame, a plate secured to said cross-bar, and an angle member having a horizontal portion rigidly secured to said body and having a vertical depending portion extending between and pivotally connected to said plate and cross-bar.

2. The combination with a tractor having a draw-bar cap, of a bracket secured to the cap, an auxiliary frame having a cross-bar, means for pivotally connecting said cap to said cross-bar including a pivot member extending through said bracket and cross-bar, and a coupling member carried by said frame.

3. The combination with a vehicle body and an axle journalled in the body, of a frame positioned below said axle and extending the full length of the body, cross bars carried by said frame, yokes depending from the forward end of said body and pivotally connected to certain of said cross bars, and an angle member rigidly secured to the rear end of said body and pivotally secured to another of said cross bars.

4. The combination with a vehicle body and an axle journalled in the body, of a frame positioned below said axle and extending the full length of the body, cross bars carried by said frame, a bowed plate secured to one of said cross bars, and an angle member secured to the body having a portion extending between and pivotally connected to the plate and last mentioned cross bar.

5. In combination, a vehicle body having longitudinally spaced depending projections at its forward end, a draw bar cap secured to said body at the rear end thereof, an axle carrying frame extending longitudinally of said body and including a plurality of cross bars, one of said cross bars being under each of said projections, and one of said cross bars being under said draw bar cap, and pivotal connections between said cross bars and said projections and draw bar cap respectively.

6. In combination, a vehicle body having longutidnally spaced depending yokes at its forward end, a draw bar cap secured to said body at its rear end, an axle carrying frame extending longitudinally of said body and including a plurality of cross bars, and pivotal connections between said cross bars and said yokes and draw bar cap respectively.

In testimony whereof I affix my signature.

JAMES H. CLARK.